(12) United States Patent
Dandrow et al.

(10) Patent No.: US 12,313,763 B1
(45) Date of Patent: May 27, 2025

(54) PROGRAMMABLE DIGITAL SUBCHANNEL PROCESSOR FOR RADAR DETECTOR

(71) Applicant: NoLimits Enterprises, Inc., Cincinnati, OH (US)

(72) Inventors: Jonathan Dandrow, Cincinnati, OH (US); Robert Carson Taylor, Hamilton, OH (US)

(73) Assignee: NoLimits Enterprises, Inc., Cincinnati, OH (US)

( * ) Notice: Subject to any disclaimer, the term of this patent is extended or adjusted under 35 U.S.C. 154(b) by 437 days.

(21) Appl. No.: 17/536,737

(22) Filed: Nov. 29, 2021

Related U.S. Application Data

(60) Provisional application No. 63/119,064, filed on Nov. 30, 2020.

(51) Int. Cl.
*G01S 7/02* (2006.01)
*G01S 7/41* (2006.01)

(52) U.S. Cl.
CPC .............. *G01S 7/022* (2013.01); *G01S 7/417* (2013.01)

(58) Field of Classification Search
CPC ................................ G01S 7/022; G01S 7/417
USPC .......................................................... 342/20
See application file for complete search history.

(56) References Cited

U.S. PATENT DOCUMENTS

| | | | |
|---|---|---|---|
| 4,313,216 A | 1/1982 | Jaeger et al. | |
| 4,626,857 A * | 12/1986 | Imazeki | G01S 7/022 455/226.1 |
| 4,631,542 A | 12/1986 | Grimsley | |
| 4,841,302 A | 6/1989 | Henry | |
| 4,952,936 A | 8/1990 | Martinson | |
| 4,961,074 A | 10/1990 | Martinson | |
| 5,068,663 A * | 11/1991 | Valentine | G01S 7/022 342/20 |
| 5,079,553 A | 1/1992 | Orr | |
| 5,083,129 A * | 1/1992 | Valentine | G01S 7/022 342/20 |
| 5,134,406 A | 7/1992 | Orr | |
| 5,146,226 A * | 9/1992 | Valentine | G01S 7/04 342/20 |
| 5,151,701 A * | 9/1992 | Valentine | G01S 7/022 342/20 |
| 5,164,729 A | 11/1992 | Decker et al. | |

(Continued)

*Primary Examiner* — Nuzhat Pervin
(74) *Attorney, Agent, or Firm* — Wood Herron & Evans LLP

(57) ABSTRACT

A radar detector employs parameterized subchannel analysis for discrimination of radar signals. Specifically, the signal processing of the radar detector includes a subchannel processor for evaluating programmable sub-bands of a channel for enhanced pattern identification. The subchannel processor specifically incorporates multiple digital demultiplexing stages, producing N signal subchannels at selectable frequencies. The subchannels are decimated from the original sampling frequency to a selectable lower sample frequency, e.g. using a cascaded integrator-comb filter, and then filtered, e.g. using a finite impulse response filter. The resulting sub channels 0 to N-1 are delivered for Neural Network assessment. Importantly, the subchannel frequencies, decimation rates and IIR filter profiles may be selectively adjusted by the control circuits to emphasize relevant patterns to be extracted by the neural network from a received radar signal.

7 Claims, 3 Drawing Sheets

(56) References Cited

U.S. PATENT DOCUMENTS

| | | | |
|---|---|---|---|
| 5,206,651 A * | 4/1993 | Valentine | G01S 7/022 342/195 |
| 5,250,951 A * | 10/1993 | Valentine | G01S 7/04 340/506 |
| 5,300,932 A | 4/1994 | Valentine et al. | |
| 5,305,007 A | 4/1994 | Orr et al. | |
| 5,315,302 A | 5/1994 | Katsukura et al. | |
| 5,461,383 A | 10/1995 | Ono et al. | |
| 5,646,624 A | 7/1997 | Cope et al. | |
| 5,835,052 A | 11/1998 | Iwakuni | |
| 5,852,417 A | 12/1998 | Valentine et al. | |
| 5,856,801 A | 1/1999 | Valentine et al. | |
| 5,900,832 A | 5/1999 | Valentine et al. | |
| 5,917,441 A | 6/1999 | Valentine et al. | |
| 5,990,821 A | 11/1999 | Sakar | |
| 6,043,771 A * | 3/2000 | Clark | G01S 7/021 342/13 |
| 6,140,809 A | 10/2000 | Doi | |
| 6,175,324 B1 | 1/2001 | Valentine et al. | |
| 6,204,798 B1 * | 3/2001 | Fleming, III | G01S 7/022 342/52 |
| 6,239,735 B1 | 5/2001 | Ono | |
| 6,400,305 B1 | 6/2002 | Kuhn | |
| 6,400,306 B1 | 6/2002 | Nohara et al. | |
| 6,463,091 B1 | 10/2002 | Zhodzicshsky et al. | |
| 6,617,995 B2 | 9/2003 | Kim et al. | |
| 6,670,905 B1 | 12/2003 | Orr | |
| 6,693,578 B1 | 2/2004 | Martinson | |
| 7,023,374 B2 | 4/2006 | Jossef et al. | |
| 7,061,423 B1 | 6/2006 | Valentine et al. | |
| 7,206,359 B2 * | 4/2007 | Kjeldsen | H04L 25/03853 375/295 |
| 7,215,276 B2 | 5/2007 | Batten et al. | |
| 7,301,453 B2 | 11/2007 | Fry | |
| 7,388,537 B2 * | 6/2008 | Martinson | G01S 7/022 342/100 |
| 7,430,254 B1 * | 9/2008 | Anderson | H04B 1/69 375/350 |
| 7,576,679 B1 * | 8/2009 | Orr | G01S 19/42 342/13 |
| 7,593,449 B2 * | 9/2009 | Shattil | H04J 13/10 375/150 |
| 7,948,427 B2 | 5/2011 | Wen et al. | |
| 7,965,761 B2 * | 6/2011 | Shattil | H04J 14/0298 375/147 |
| 8,026,840 B2 * | 9/2011 | Dwelly | G01S 13/88 342/134 |
| 8,045,654 B1 * | 10/2011 | Anderson | H04B 1/69 375/350 |
| 8,180,392 B2 | 5/2012 | Sekiya et al. | |
| 8,958,506 B2 * | 2/2015 | Seely | H04L 7/042 375/343 |
| 8,988,272 B2 | 3/2015 | Chernukhin | |
| 9,014,307 B2 * | 4/2015 | Seely | H04L 27/0008 375/350 |
| 9,077,487 B2 * | 7/2015 | Seely | H04L 1/0003 |
| 9,252,998 B2 * | 2/2016 | Seely | H04L 27/16 |
| 9,426,680 B2 * | 8/2016 | Seely | H04W 24/08 |
| 9,900,796 B2 * | 2/2018 | Seely | H04W 24/04 |
| 11,422,252 B2 * | 8/2022 | Bowring | G01S 7/417 |
| 11,852,750 B2 * | 12/2023 | Kim | G01S 7/417 |
| 11,907,829 B2 * | 2/2024 | Meissner | G01S 7/417 |
| 2003/0231714 A1 * | 12/2003 | Kjeldsen | H04L 27/2601 375/259 |
| 2004/0151137 A1 | 8/2004 | McFarland et al. | |
| 2005/0212672 A1 | 9/2005 | Fry | |
| 2006/0139203 A1 | 6/2006 | Kim et al. | |
| 2007/0018879 A1 | 1/2007 | Batten et al. | |
| 2007/0120728 A1 * | 5/2007 | Orr | G01S 7/022 342/51 |
| 2007/0211786 A1 * | 9/2007 | Shattil | H04J 13/00 375/147 |
| 2009/0110033 A1 * | 4/2009 | Shattil | H04B 1/7174 375/147 |
| 2009/0146863 A1 | 6/2009 | Wen et al. | |
| 2010/0019947 A1 | 1/2010 | Kruys et al. | |
| 2010/0075704 A1 | 3/2010 | McHenry et al. | |
| 2011/0102232 A1 * | 5/2011 | Orr | G01C 21/3658 342/20 |
| 2011/0241923 A1 | 10/2011 | Chernukhin | |
| 2014/0241178 A1 * | 8/2014 | Seely | H04W 24/04 370/252 |
| 2014/0241468 A1 * | 8/2014 | Seely | H04L 27/0002 375/340 |
| 2014/0241469 A1 * | 8/2014 | Seely | H04L 27/12 375/316 |
| 2014/0242922 A1 * | 8/2014 | Seely | H04L 27/0014 455/73 |
| 2014/0242931 A1 * | 8/2014 | Seely | H04L 27/0008 455/207 |
| 2014/0242936 A1 * | 8/2014 | Seely | H04L 27/10 455/307 |
| 2014/0266853 A1 * | 9/2014 | Orr | G01S 7/023 342/20 |
| 2015/0283939 A1 * | 10/2015 | Parkes | B60Q 1/544 340/468 |
| 2016/0187461 A1 * | 6/2016 | Orr | G01S 7/04 342/20 |
| 2016/0277132 A1 * | 9/2016 | Pratt | H04B 7/10 |
| 2016/0337891 A1 * | 11/2016 | Seely | H04W 24/08 |
| 2017/0090012 A1 * | 3/2017 | Kuhn | G01S 7/003 |
| 2020/0292660 A1 * | 9/2020 | Meissner | G01S 7/023 |
| 2020/0328916 A1 * | 10/2020 | Nikitin | H04B 1/1027 |
| 2021/0314201 A1 * | 10/2021 | Nikitin | H04L 25/08 |
| 2022/0128657 A1 * | 4/2022 | Kale | G01S 13/867 |

* cited by examiner

PROGRAMMABLE DIGITAL SUBCHANNEL PROCESSOR FOR RADAR DETECTOR

RELATED APPLICATIONS

This application claims priority benefit of provisional application Ser. No. 63/119,064 filed Nov. 30, 2020, which is incorporated herein by reference in its entirety.

BACKGROUND OF THE INVENTION

The present invention relates to the discrimination of law enforcement radar signals from collision avoidance radar systems and other sources of radar signals.

Traditionally, radar detectors include circuitry or systems for identifying incoming radar signals and characterizing those signals by strength, direction or location, frequency and/or on/off patterns. This information is fed to a programmed digital signal processing system which applies frequency filters, location/direction filters, and/or database lookups that characterize known sources, all feeding through traditional logic if-then-else statements, state machines performing analysis of behavior over time, chirp compression filters, and similar logical systems to process the incoming signals. These methods have been developed over many years and have become increasingly complex as a greater number and diversity of non-law enforcement radar sources appear on the open roads, from such diverse sources as collision avoidance/driver assistance systems, roadside traffic sensors, door openers and other non-traffic fixed radar sources, and even poorly shielded radar detectors.

SUMMARY OF THE INVENTION

According to principles of the present invention, an artificial intelligence type neural network is applied to the problem of classification and discrimination of radar sources. Specifically, an artificial intelligence deep neural network classifies radar sources received into a radar detector.

To enhance the signal discrimination of the neural network architecture, the radar detector signal processing section employs unique methods for channel analysis. Specifically, the signal processing includes a subchannel processor for evaluating programmable sub-bands of a channel for enhanced pattern identification. The subchannel processor specifically incorporates multiple digital demultiplexing stages, producing N signal subchannels at selectable angular frequencies $\omega_0$ through $\omega_{N-1}$. The subchannels are then decimated from the original sampling frequency to a selectable lower sample frequency, e.g. using a cascaded integrator-comb filter, and then filtered, e.g. using a finite impulse response filter. The resulting sub channels 0 to N−1 may then be delivered for Neural Network assessment. Importantly, the subchannel frequencies ($\omega_0$ through $\omega_{N-1}$, decimation rates and IIR filter profiles may be selectively adjusted to emphasize relevant patterns to be extracted from a channel signal.

It will be appreciated that the neural network may consist of multiple deep layers including, but not limited to; convolutional layers, max pooling layers, dropout layers, fully connected layers, recurrent layers, and long short-term memory (LSTM). The case of LSTM layers may prove especially helpful for input data that undergoes meaningful temporal changes. The neural network may be multi-class, with an output class for each radar source that may be encountered. The neural network may also be multi-label, where each output class can be present simultaneously and concurrently with and without any combination of the other output classes. In the case of a multi-label neural network multiple radar sources and threats can be present at the same time, and the neural network may discriminate and classify each radar source and treat each individually.

In one specific embodiment the neural network may consist of a reinforcement learning agent. A reinforcement learning agent samples its environment, makes multiple decisions, and is ultimately rewarded or penalized based on a reward function defined by the user.

In the one specific embodiment, a supervised initial training of a neural network uses an initial set of known-origin signals, which may include those known to originated either from law enforcement radar and/or non-law enforcement sources. In one embodiment only signals originated from non-law enforcement radar sources are utilized. In training, the neural network develops neural pathways to recognize the known-origin radar signals, as well as subchannel parameters to enhance the distinctive characteristics of those signals in each channel.

It will be appreciated that the known-origin signals may be collected via laboratory simulation of known publicly occurring radar signals or collection of publicly occurring radar signals gathered in field surveys of the target radar environment(s). In an alternative embodiment, the neural network may be trained in an unsupervised manner using signals of unknown origin which are typical publicly occurring signals. In the latter case the neural network will learn to distinguish the various signals and report the signal source. Alternatively, or in addition, the neural network may also learn to distinguish behaviors that are associated with the law enforcement-originated signals enabling the neural network to identify a signal as law enforcement originated. For example, law enforcement originated signals have an intermittent nature, tend to suddenly appear, and tend to correlate with driver behaviors such as slower speeds or braking when drivers recognize that speed monitoring is occurring. The neural network can identify these correlated effects and use them to identify a signal as law enforcement-originated without supervised training.

The initially trained neural network may then be deployed on a radar detector; once deployed in the radar detector the neural network may use its trained neural pathways and subchannel parameters to classify the source of incoming radar signals and specifically to identify the source as either law enforcement radar or non-law enforcement originated interference sources, and from this determination a radar detector may filter false alert signals during operation, and display the identity of a known law enforcement source such as the make and model of a radar gun or other law enforcement radar source.

In one embodiment, the initially trained neural network further improves its operation by retraining neural pathways based upon characteristics of signals encountered by the neural network while operating in the field (known as "transfer learning"), so that those signals may be characterized as law enforcement-originated or non-law enforcement-originated based upon signal characteristics, vehicle behaviors and/or input from a user of the radar detector. These additional imprinted neural pathways of the radar detector may then improve discrimination of law enforcement-originated radar signals from non-law enforcement radar signals. This process may improve operation by imprinting neural pathways to recognize signals which are unique to a particular geographic area (such as a region in which different licensed bands or different law enforcement equipment is utilized), or which are unique to a particular deployment circumstance (such as the host automobile's on-board crash avoidance system).

It will be recognized that the neural network may learn neural network weights to recognize any number of additional fixed or in-vehicle technologies which appear in the environment where the neural network is deployed. In this respect the use of artificial intelligence/machine learning/ neural networks has a unique advantage as compared to traditional radar detector control strategies which rely upon pre-programmed logic systems and can implement only a limited extent of field learning to the extent it is structured by the pre-programmed logic system.

In specific embodiments, the deployed neural networks on radar detectors in the field are subsequently connected to a host to provide details of the retrained neural pathways created therein to the host, such that the host may integrate those modified pathways into its existing neural networks, for improvement of the training of the neural network. Alternatively, or in addition, the connection to the host may permit the deployed radar neural network to be updated using improved training from the host developed in this manner or other manners.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

In the following detailed description of several illustrative embodiments, reference is made to the accompanying drawings that form a part hereof, and in which is shown by way of illustration specific preferred embodiment in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
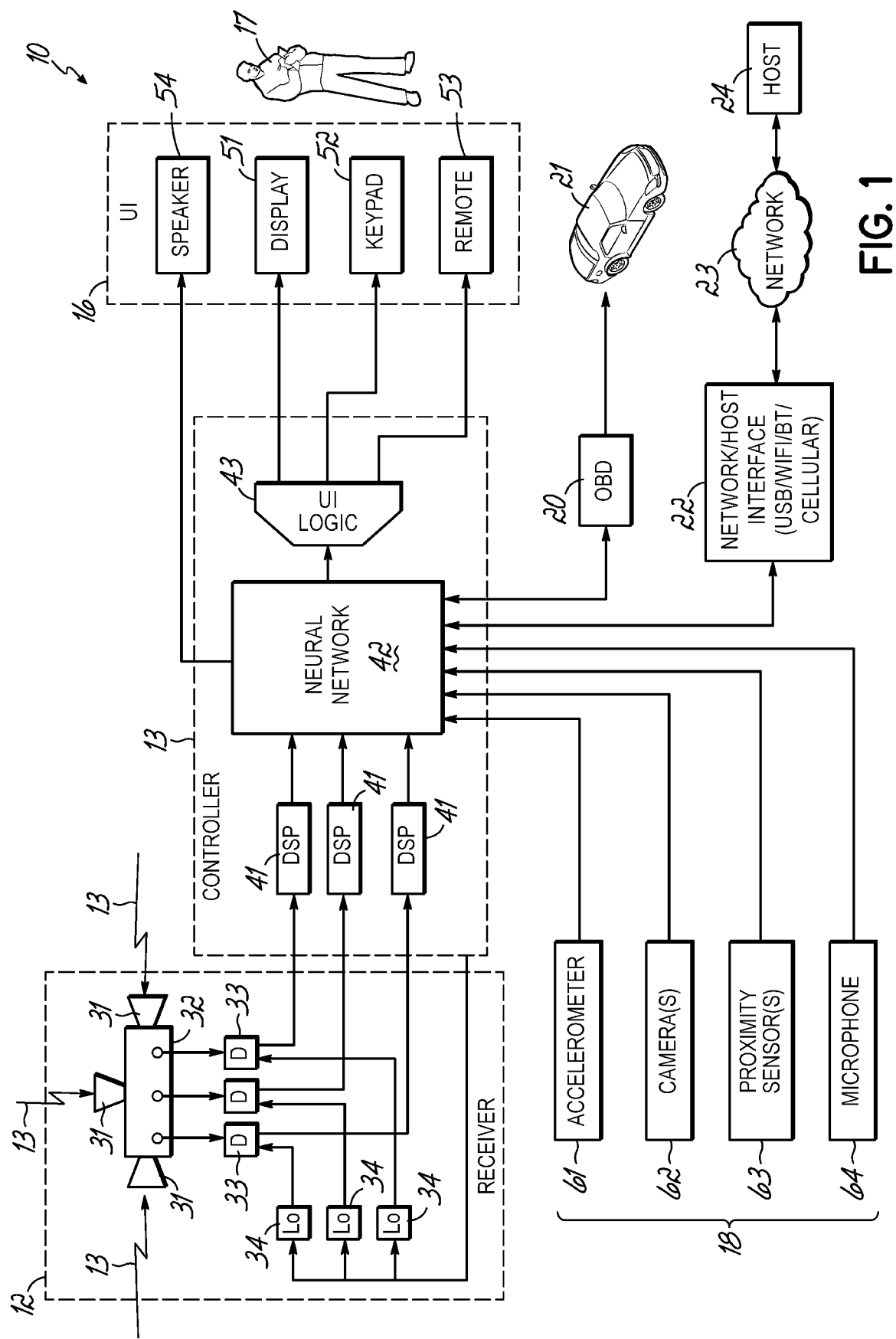
FIG. 1 is a schematic view of a radar detector utilizing a neural network.

FIG. 1 is a schematic view of a radar detector utilizing a neural network. The detector 10 generally comprises a receiver section 12, controller/filtering section 14, user interface 16, and (optionally) sensors 18.

The receiver section 12 receives radar signals 13 via one or several antennae such as horn antennae 13 shown in FIG. 1. These are fed through stripline, filtering and (optionally) low noise amplification stage 32. In one embodiment the signal is then fed to a demodulation stage 33 where the received radar signal is mixed with a local oscillator from a source 34. Although three antennae independently feeding three demodulation stages 33 using three local oscillator sources 34 are shown in FIG. 1, it will be appreciated that in other embodiments repetition of the front-end radio frequency electronics can be avoided by multiplexing between multiple antennae through a switch. Furthermore, principles of the present invention are applicable to radar detectors having only a single antenna as well as to embodiments featuring multiple antennae.

The output(s) from the receiver section typically comprise an intermediate frequency demodulated signal representing the radio frequency content received in the antenna(e). This intermediate frequency content is typically in the form of a swept spectral representation of the content received by the antenna. Numerous methods have been developed and disclosed for the reception and demodulation of radio frequency signals from one or several antennae and will not be elaborated here. Importantly the demodulated intermediate frequency signals are delivered to the controller 14 where they are converted to digital signals, typically in an intermediate frequency band, and then processed through digital signal processing 41 to provide a sequence of spectral content snapshots to the neural network 42 which may use the same to identify a signal from its frequency, and/or amplitude or frequency modulation.

Neural network 42 implements the machine learning/ artificial intelligence principles, as described in greater detail in Patent Cooperation Treaty Application Serial No. PCT/US20/35532, filed Jun. 1, 2020, which is hereby incorporated herein in its entirety as if fully set forth herein. The neural network 42 uses digital signal processed data derived from the intermediate frequency demodulated signals from the receiver section, as well as (optionally) signals from the sensors 18. Neural network 42 responds to this content and its internal neural pathways to discriminate between incoming radar signals from non-law enforcement sources and those from law enforcement sources, and produce an output indicating the results of this analysis.

The output of the neural network is delivered to a user interface logic section 43 which assesses that output and determines whether to initiate an alert, such as a warning that radar determined to be from law enforcement sources has been identified. The warning information may usefully include make and model information for the known law enforcement radar source detected by the neural network.

Alerts are delivered to a user via the user interface 18 which is connected to and responsive to the user interface logic 43 of the controller 14. The user interface includes a display 51 for presenting information about the operation of the radar detector, including details about alerts which are identified by the controller 14, which are typically (but not necessarily) accompanied with a display readout and/or a speaker tone, chip or spoken voice. The user interface further includes a keypad 52 for receiving commands from the user (adjusting settings of the radar detector, acknowledging and/or muting alerts, and optionally providing user feedback on the nature (law enforcement-originated or not) of signals which have triggered an alert. The keypad may take the form of a series of keys or buttons on the housing of the radar detector. Optionally additional keys or buttons may be included on a remote device which may be positioned conveniently within the passenger cabin, or included on the detector power cord.

The detector power cord may usefully take the form of a USB3 power cord, which differs from a conventional USB3 power cord by the inclusion of one or more buttons the user may press to, for example, mute an alert, confirm an alert, or take other actions as defined by the device user interface.

The radar detector controller 14 is also optionally responsive to a variety of sensor inputs, including for example an accelerometer sensor 61 for detecting acceleration, braking, cornering or collisions of the vehicle in which the radar detector is deployed. Also optionally included are one or more camera sensor(s) which detect conditions around the vehicle, such as the nature of the roadway, weather conditions, proximity of traffic, the behavior of traffic, the visible presence of law enforcement vehicles, and the like. Further, optional proximity sensors can similarly detect proximity of traffic and vehicles, lane positioning of the vehicle, and potentially roadway parameters. Also, a microphone sensor may be included to detect cabin sounds and thereby determine the operational state of the vehicle and an ambient temperature sensor can use vehicle temperature information to characterize operation as well.

Additional information useful in determining the operational state of the vehicle can be gathered from the vehicle's data bus, which will generally provide a range of data regarding the operation of the vehicles engine and main sensor systems. This data is optionally obtained in the illustrated embodiment via an On Board Diagnostics (OBD-II) connector 20 coupled to the data bus of the vehicle 21.

Finally, the detector may optionally interface with a host system, such as a central server, to acquire updates or deliver learned data to the host, or even to receive information on radar signals detected by other devices so that those signals can be fed to the neural network and used in development of neural pathways. This interface can be achieved in a variety of manners, such as via a network connector, USB connect, WiFi circuits, Bluetooth circuits, circuits supporting other 801.11 protocols such as Zigbee, or circuits supporting cellular connectivity, all of which are schematically represented by interface 22, and connect via the public network cloud 23 to the host 24.

Further details of the neural network and its configuration may be found in the above-referenced Patent Cooperation Treaty patent application.

Figure 2:
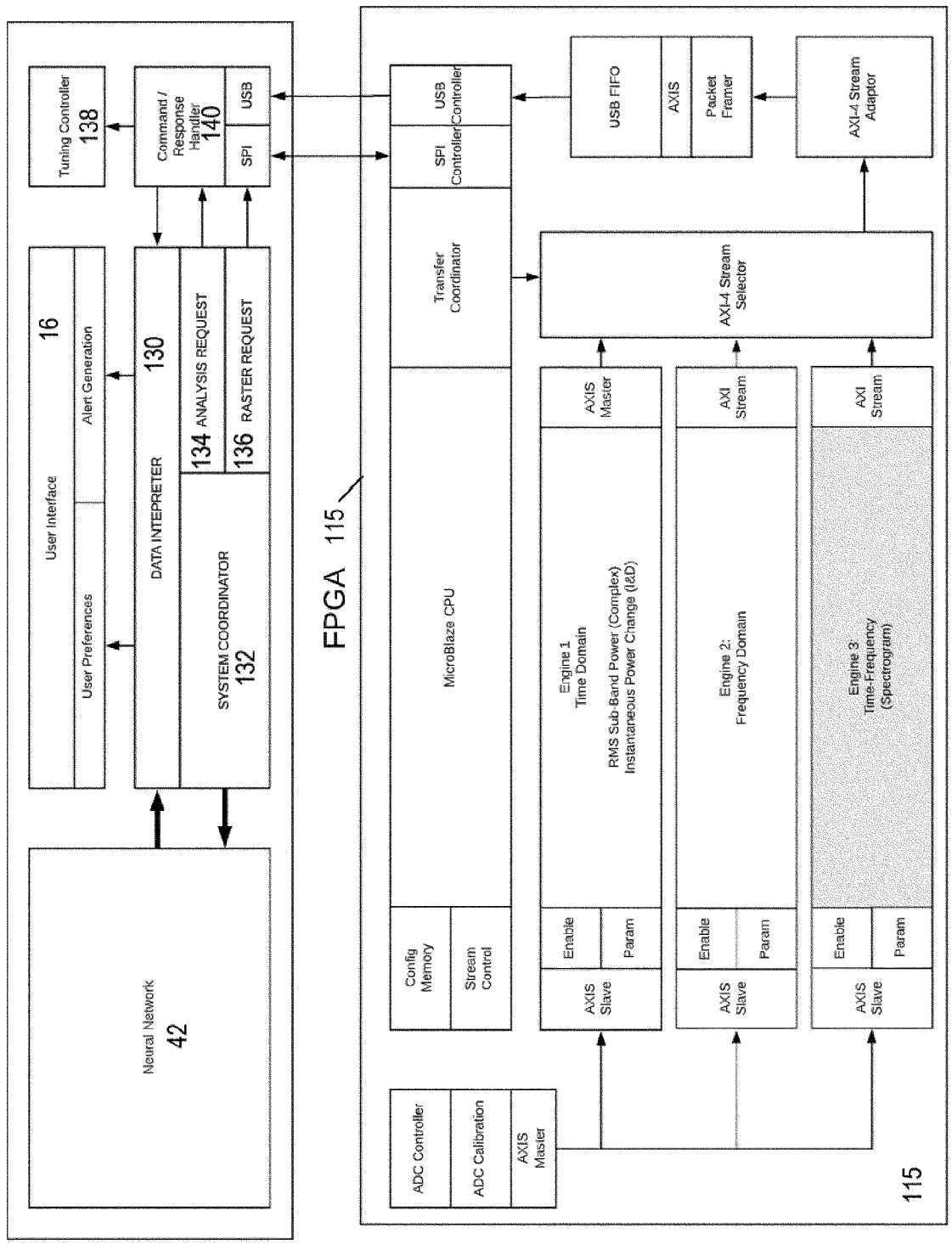
FIG. 2 is an information flow diagram of a field programmable gate array used for digital signal processing in the embodiment of FIG. 1.

Referring now to FIG. 2, the logical flow of signal information of the exemplary device of FIG. 6 is useful to understand the cooperative functioning of the system processor, peripheral circuits, FPGA, and neural network.

The overall processing activity of the system that is outlined above is orchestrated by a Data Interpreter 130 and System Coordinator 132 implemented in a System Processor. These modules generate Analysis Requests 134 for handling by the FPGA 115 and also originate Raster Requests 136 when a particular signal is to be analyzed by the Neural Network 42.

Analysis Requests are handled by the Command/Response Handler 140, which orchestrates tuning of incoming signal via Tuning Controller 138 and further orchestrates analysis by a customized integrated circuit such as a Field Programmable Gate Array (FPGA) 115 via commands sent over an SPI interface.

Upon command, incoming signal information is acquired into FPGA 115 from the Analog/Digital Converter 114 under control of the ADC controller and ADC Calibration blocks of the FPGA 115. This data is then delivered as an AXIS stream under the control of the ADC controller/calibration blocks, to one, two or all of three processing engines:

Engine 1 performs Time Domain analysis of the incoming signal to develop RMS Sub-Band complex power data and instantaneous power change information.

Engine 2 performs Frequency Domain (Fourier Transform) analysis of the incoming signal.

Engine 3 performs Time-Frequency (Spectrogram) analysis of the incoming signal.

The output of Engines 1, 2 and 3 are delivered as a result AXIS stream via a stream selector and stream adapter to a packet framer which arranges the resulting data for delivery via a USB FIFO and controller to the USB interface of the Carrier Board for handling by the Command/Response Handler 140.

In the event a signal is to be analyzed by Neural Network 42, a Raster Request 136 is delivered from System Coordinator via the SPI interface to the FPGA 115 which returns the requested Raster, which is then delivered to Neural Network 42 for analysis. The resulting analytical response from Neural Network 42 then informs the decision to initiate Alerts via the User Interface 16 (FIG. 1). The user interface may also be used to define User Preferences for altering the operation of the system; e.g., by engaging or disengaging various band monitors or filters. Furthermore, in a learning mode, the User Interface can obtain information from a user indicating feedback on the appropriateness or quality of an alert determination in order to improve the operation of the Neural Network.

Figure 3:
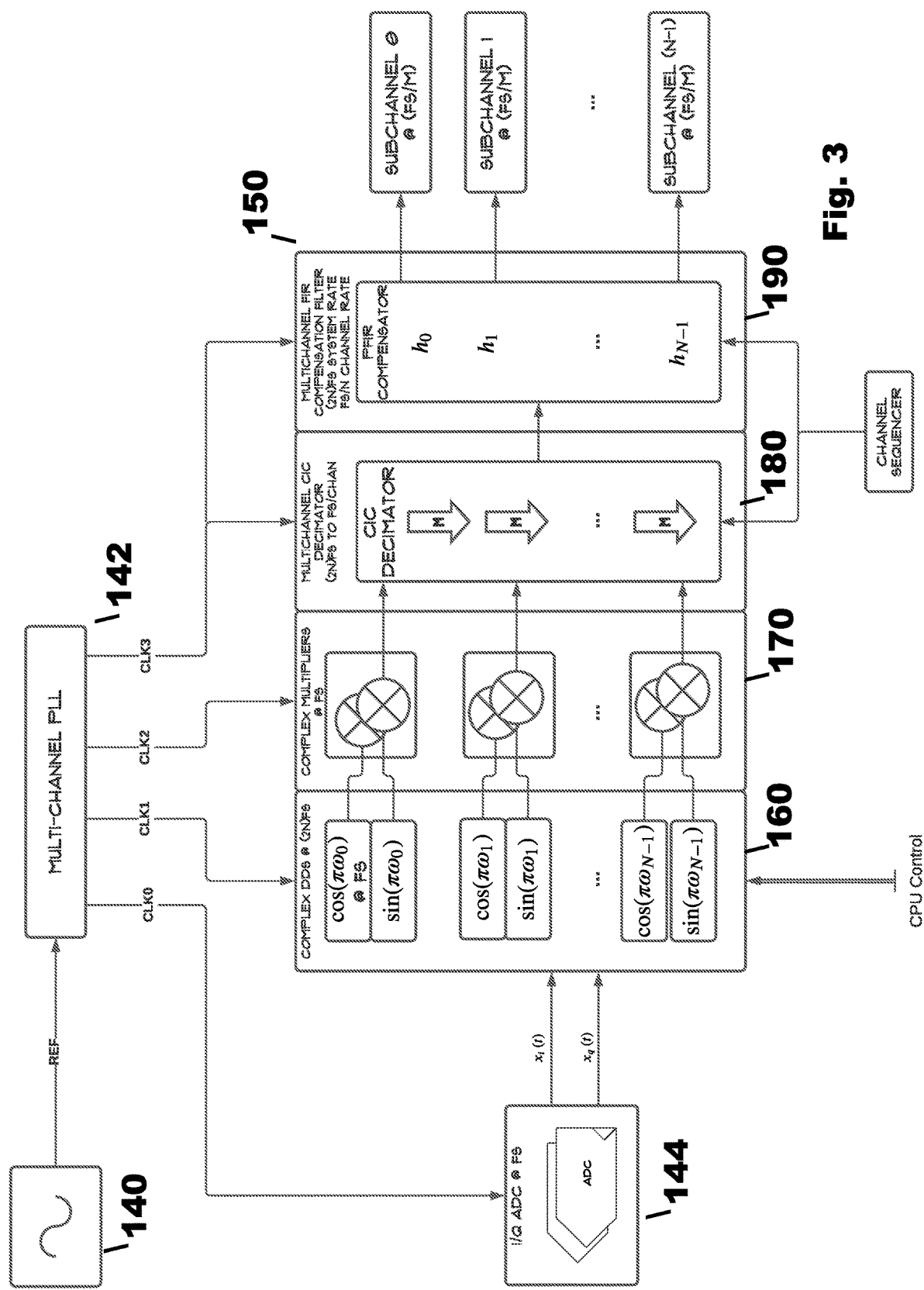
FIG. 3 is a block diagram of a subchannel processing system of the FPGA of FIG. 2.

FIG. 3 illustrates a detailed implementation of an FPGA subchannel processor for evaluating programmable sub-bands of a channel for enhanced pattern identification. The subchannel processor 150 develops N digital subchannel signals, each representing a subchannel of the in-phase and quadrature (I/Q) output of an Analog to Digital Converter (ADC) 144 and representing signal characteristics in one of N selected subchannel frequencies. The subchannel frequencies $\omega_0$ through $\omega_{N-1}$ are produced by N complex direct digital synthesizers 160; these subchannel frequencies are used to demodulate the I/Q signal from ADC 144, using N complex multipliers 170. The resulting demodulated subchannel signals are then respectively decimated and low pass filtered by an N subchannel Cascaded Integrator-Comb (CIC) filter decimator stage, which decimates each demodulated subchannel signal by a factor of M, producing N decimated subchannel signals. These N decimated subchannel signals are then filtered by an N subchannel Finite Impulse Response (FIR) compensation filter producing a filtered output for each of subchannels 0 through N−1.

It will be appreciated that each of the stages 160, 170, 180 and 190 is responsive to a sampling clock CLK1, CLK2, CLK3 which is derived from the base sampling clock CLK0 thus maintaining digital phase lock throughout the process. Sampling clock CLK0 and other clock signals of the subchannel processor are produced by a multi-channel phase locked loop (PLL) 142 in response to a master clock signal 140.

It will be further appreciated that the subchannel demodulator shown in FIG. 3 is fully programmable as appropriate for extracting distinctive elements from each channel under study, through the adjustment of (a) the subchannel demodulation frequencies $\omega_0$ through $\omega_{N-1}$ 160 (b) the characteristics of the CIC decimator 180 and (c) the characteristics of the FIR filters 190. The appropriate parameters for isolating, decimating and filtering desirable subchannels can be developed during training and neural network assessment using any of the above-described methods. By a learning technique, the subchannel frequencies $\omega_0$ through $\omega_{N-1}$, decimation rates and IIR filter profiles may be selectively adjusted to emphasize relevant patterns to be extracted from a channel signal to accurately identify a radar source of interest.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A radar detector, comprising
   a. a radar receiver for receiving and characterizing the signal characteristics of a received radar signal, wherein the received radar signal includes signals generated remotely by one or more law enforcement sources, or signals generated remotely by one or more non-law enforcement sources, or both, the radar receiver using a local oscillator that is not synchronized to any of said sources to provide an output representative of the received radar signal comprising one or more of radar frequency, radar intensity and radar direction,
   b. a control system coupled to the radar receiver and receiving the output thereof, the control system comprising a neural network structured in multiple layers each processing signal characteristics delivered thereto to develop neural pathways associated with the distinguishing signatures of the signal characteristics of remotely generated signals from law enforcement sources when provided to the neural network, and
   c. a digital signal processing section processing N subchannels of the output of the radar receiver, where N is greater than 1, the digital signal processing section comprising an analog to digital converter, a demultiplexing stage comprising N synthesizers and N multipliers, a decimation stage comprising N decimators, and a filtering stage comprising N compensation filters, the corresponding synthesizer, multiplier, decimator and filter operating to produce subchannels of the radar receiver output, the digital signal processing section coupled to the control system to provide subchannels of the radar receiver output to the neural network,
   wherein the control system identifies the presence, or absence, of a remotely generated signal from a law enforcement source based upon the distinguishing signatures of signal characteristics associated with neural pathways within the neural network, and communicates the result of the identification as a radar detection output.

2. The radar detector of claim 1 wherein the analog to digital converter is an in phase and quadrature (I/Q) converter producing an I/Q digital output, and the N multipliers are complex multipliers.

3. The radar detector of claim 1 wherein parameters of at least one synthesizer, decimator, or filter for at least one subchannel are adjustable.

4. The radar detector of claim 3 wherein the control system provides parameters for adjustment of at least one synthesizer, decimator, or filters for at least one subchannel in response to learned characteristics of signals to be identified by neural network.

5. The radar detector of claim 4 wherein the neural network develops neural pathways associated with distinguishing characteristics relating to signals provided to the neural network and parameters for at least one subchannel to emphasize those characteristics.

6. The radar detector of claim 3 wherein at least one kernel of a convolutional layer of said neural network is trained to detect one or more of specific frequencies of a radar signal, specific combinations of different frequencies of a radar signal, specific combinations of different frequencies at different relative amplitudes of a radar signals, and specific transients, or changes in frequency and amplitude, of a radar signal, and produces parameters for adjustment of at least one synthesizer, decimator, or filter for at least one subchannel in response thereto.

7. The radar detector of claim 1 further comprising a display for communicating radar signal information to a user, the display identifying a make and/or model of an identified known law enforcement radar source.

* * * * *